US012096734B2

(12) United States Patent
Cai et al.

(10) Patent No.: US 12,096,734 B2
(45) Date of Patent: Sep. 24, 2024

(54) HEATER FOR AN INDOOR GROW FACILITY

(71) Applicant: HGCI, Inc., Las Vegas, NV (US)

(72) Inventors: Dengke Cai, Camas, WA (US); Martin R. Mason, Vancouver, WA (US); Daniel Martin Horjus, Vancouver, WA (US)

(73) Assignee: HGCI, Inc., Las Vegas, NV (US)

( * ) Notice: Subject to any disclaimer, the term of this patent is extended or adjusted under 35 U.S.C. 154(b) by 633 days.

(21) Appl. No.: 17/342,692

(22) Filed: Jun. 9, 2021

(65) Prior Publication Data

US 2022/0394935 A1 Dec. 15, 2022

(51) Int. Cl.
*A01G 9/24* (2006.01)
*A01G 7/02* (2006.01)
*F24C 3/06* (2021.01)

(52) U.S. Cl.
CPC ............ *A01G 9/246* (2013.01); *A01G 7/02* (2013.01); *F24C 3/062* (2013.01)

(58) Field of Classification Search
CPC ........... A01G 9/246; A01G 7/02; F24C 3/062; F24C 3/045; Y02A 40/25
See application file for complete search history.

(56) References Cited

U.S. PATENT DOCUMENTS

| 2012/0253523 A1 | 10/2012 | Harrod et al. |
| 2016/0100531 A1 | 4/2016 | Ascherman |

FOREIGN PATENT DOCUMENTS

| CN | 2243172 Y | 12/1996 |
| CN | 2648803 Y | * 10/2004 |
| KR | 101125580 B1 | 3/2012 |
| KR | 101510863 B1 | 4/2015 |
| LU | 503968 B1 | * 10/2023 |

OTHER PUBLICATIONS

Thomas, Shane; International Search Report and Written Opinion of the International Searching Authority issued in International Application No. PCT/US2022/030144; Aug. 15, 2022; 6 pages.

* cited by examiner

*Primary Examiner* — Shawntina T Fuqua
(74) *Attorney, Agent, or Firm* — Frost Brown Todd LLP (57) ABSTRACT

A heater includes an enclosure, a first baffle plate, and a second baffle plate. The enclosure includes a first wall, a second wall opposite the first wall, and a top plate extending between the first wall and the second wall and cooperating with the first wall and the second wall to at least partially define an interior. The heating module is coupled with the enclosure and is disposed beneath the first baffle plate and the second baffle plate. The heater can additionally or alternatively include an air quality monitoring system and an isolation transformer. The air quality monitoring system includes an air quality controller, at least one air quality sensor, and a power input. The isolation transformer is configured to deliver power from the air quality monitoring system to a fuel system controller of the heating module to facilitate powering thereof.

20 Claims, 6 Drawing Sheets

HEATER FOR AN INDOOR GROW FACILITY

TECHNICAL FIELD

The apparatus described below generally relates to a heater for an indoor grow facility that imparts heat and carbon dioxide into the surrounding atmosphere.

BACKGROUND

Conventionally, a heater (e.g., a greenhouse heater) is provided in an indoor grow facility to provide heat and carbon dioxide into the surrounding atmosphere for encouraging plant growth.

BRIEF DESCRIPTION OF THE DRAWINGS

Various embodiments will become better understood with regard to the following description, appended claims and accompanying drawings wherein:

DETAILED DESCRIPTION

Figure 1:
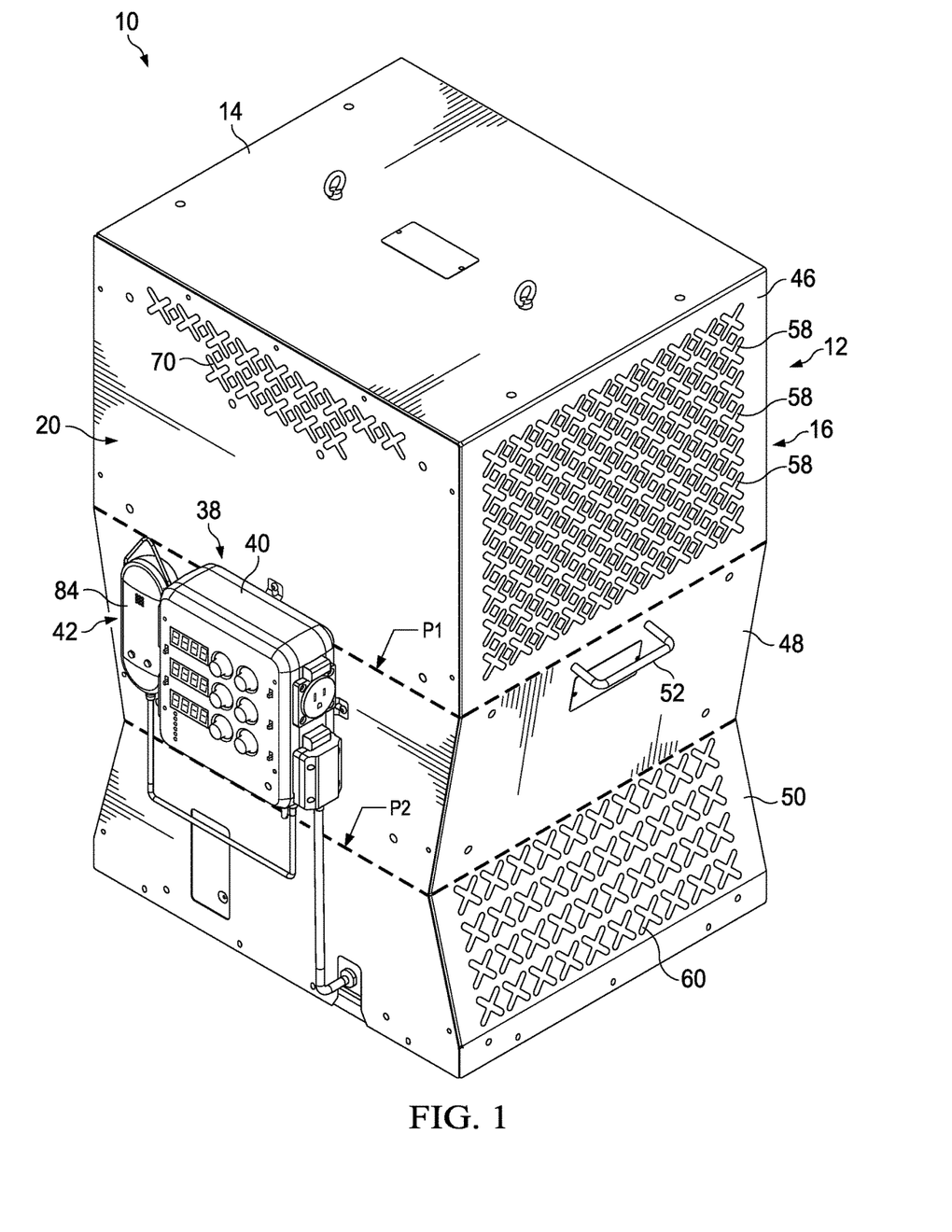
FIG. 1 is an upper rear isometric view depicting a heater.
Figure 2:
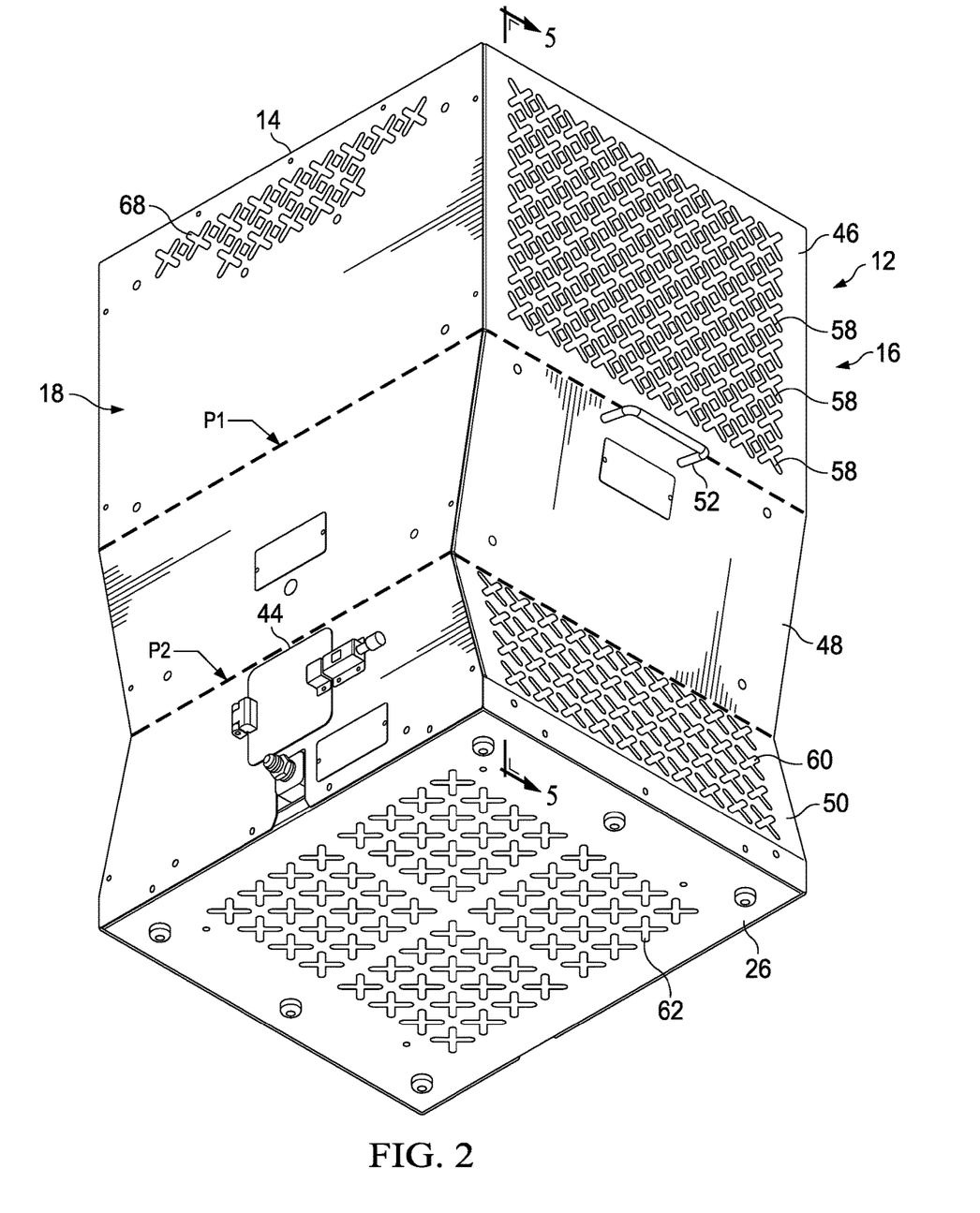
FIG. 2 is a lower front isometric view of the heater of FIG. 1.
Figure 3:
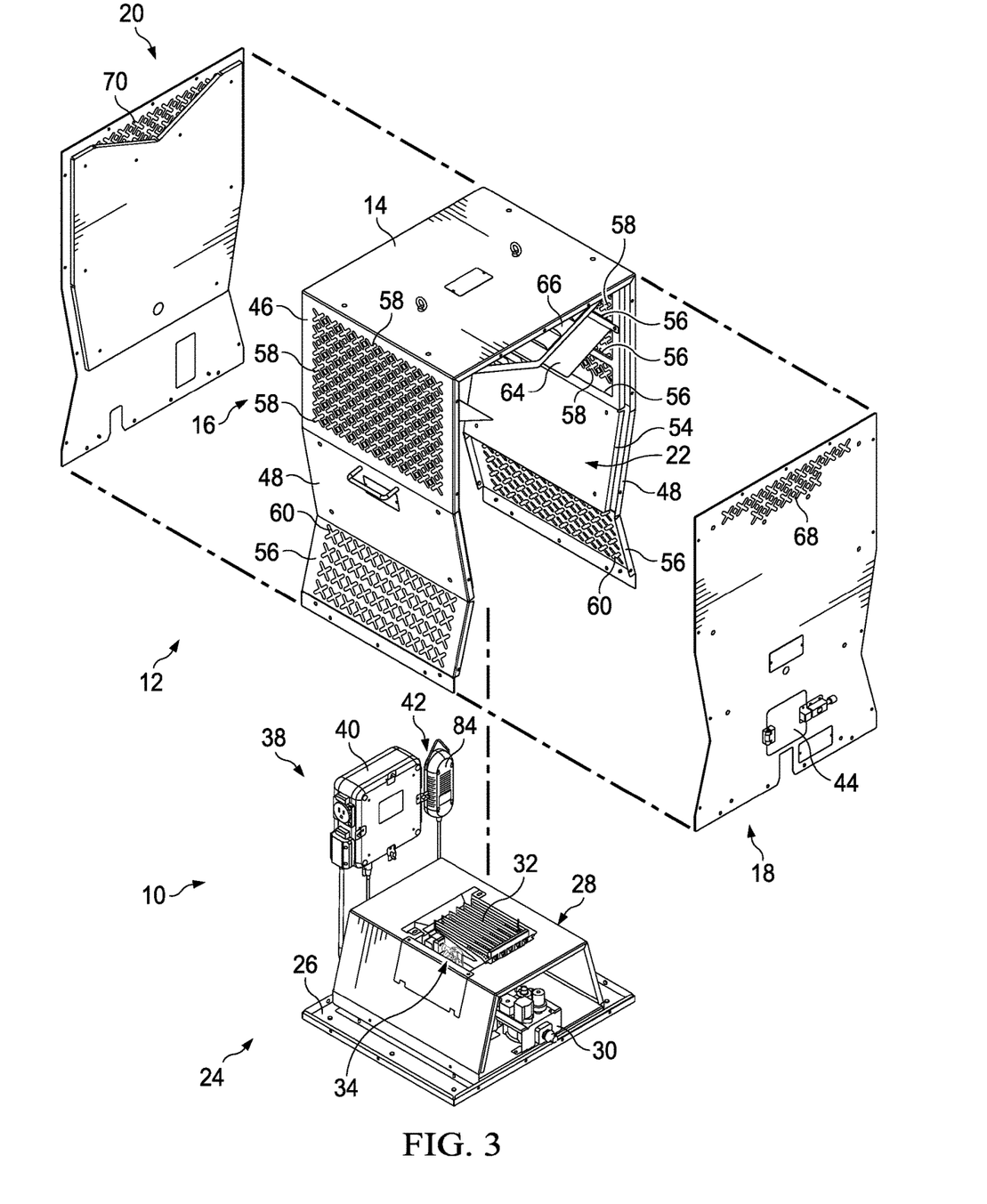
FIG. 3 is an exploded isometric view of the heater of FIG. 1.

Embodiments are hereinafter described in detail in connection with the views and examples of FIGS. 1-6, wherein like numbers indicate the same or corresponding elements throughout the views. A heater 10 for an indoor grow facility (e.g., a greenhouse heater) is generally depicted in FIGS. 1-3 and is shown to include an enclosure 12 that includes a top plate 14, a pair of sidewalls 16, a front wall 18, and a rear wall 20 that cooperate to define an interior 22 (FIG. 3). The top plate 14 can extend between the sidewalls 16 and the sidewalls 16 can extend generally downwardly from the top plate 14. In one embodiment, the top plate 14 and the sidewalls 16 can be formed together in a unitary one-piece construction such as through a metal stamping or extrusion process. The front wall 18 and the rear wall 20 can be removable from the pair of sidewalls 16 to gain access to the interior 22. In one embodiment, the front wall 18 and the rear wall 20 can be releasably coupled to the top plate 14 and the pair of sidewalls 16 by a plurality of fasteners (not shown). It is to be appreciated, however, that other releasable coupling arrangements are contemplated. The enclosure 12 can be formed of metal, such as stainless steel or aluminum, or any of a variety of other suitable materials or combinations thereof.

Figure 4:
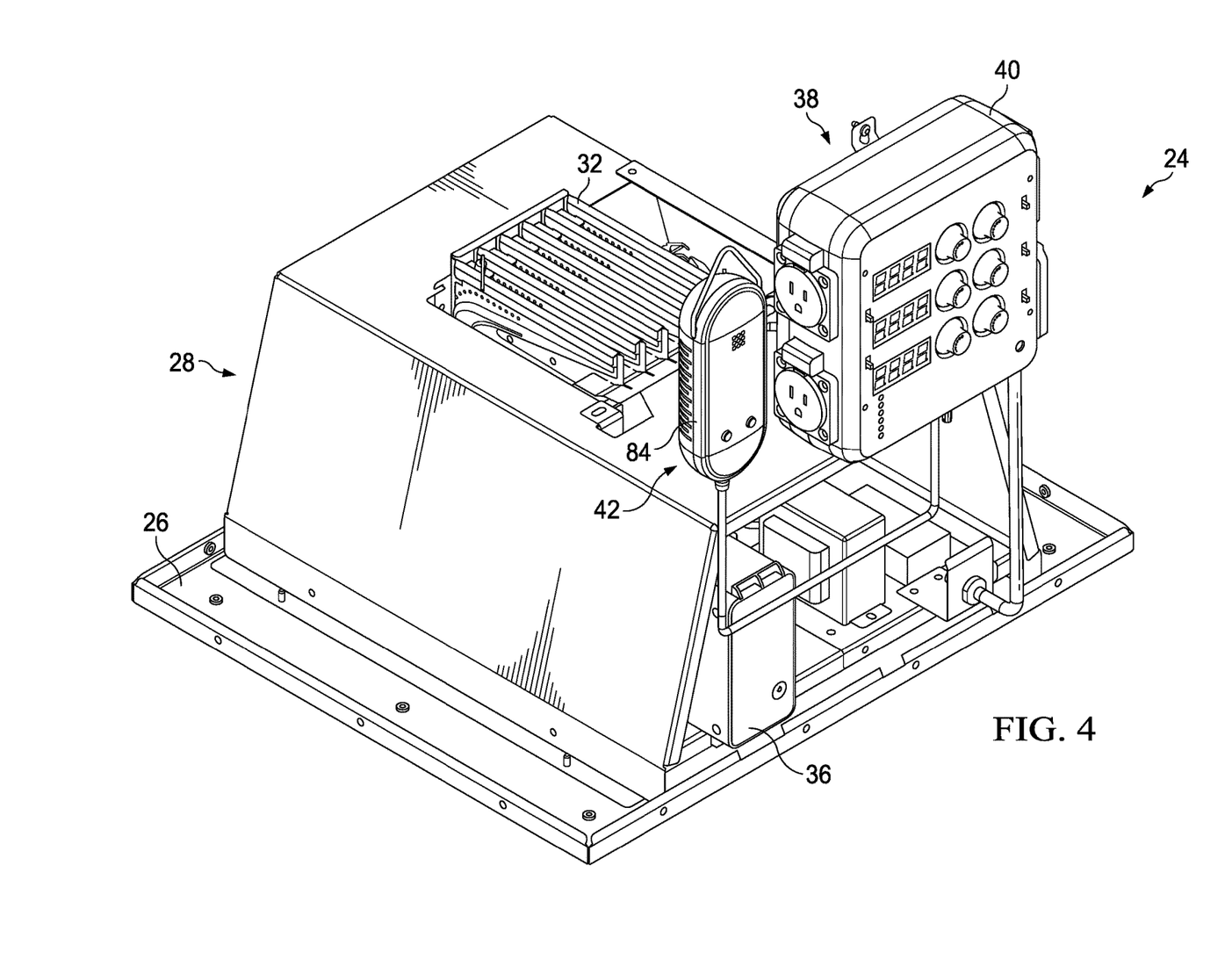
FIG. 4 is an isometric view of a heating module of the heater of FIG. 1.

Referring now to FIGS. 3 and 4, the heater 10 can include a heating module 24 that is configured to generate heat and carbon dioxide for presentation into the interior 22 that is ultimately delivered to a surrounding atmosphere. The carbon dioxide byproduct from the heating module can encourage plant growth, as will be described in further detail below. In some instances the heater 10 might be considered to be a carbon dioxide generator. The heating module 24 can comprise a bottom plate 26 and a combustion unit 28 that is coupled to the bottom plate 26 (e.g., with fasteners or through welding). The combustion unit 28 can be configured to burn a combustible fuel, such as liquid natural gas or propane, that is delivered from a remote fuel source (not shown) to produce heat and carbon dioxide. The combustion unit 28 can include a fuel delivery unit 30 that delivers fuel to a manifold 32. An igniter 34 can be located adjacent to the manifold 32 to facilitate combustion of the fuel delivered to the manifold 32 by the fuel delivery unit 30.

As illustrated in FIG. 4, the heating module 24 can include a fuel system controller 36 that is configured to control operation of the heating module 24. In particular, the fuel system controller 36 can control operation of each of the fuel delivery unit 30 (FIG. 3), the manifold 32, and the igniter 34 (FIG. 3) to initiate, maintain, and terminate the combustion process that produces the heat and carbon dioxide.

Referring again to FIGS. 3 and 4, the heating module 24 can also include an air quality monitoring system 38 that includes an air quality controller 40 and an air quality sensor module 42 that is coupled with the air quality controller 40. As will be described in further detail below, the air quality controller 40 can be configured to control operation of the fuel system controller 36 as a function of the air quality detected by the air quality sensor module 42. In one embodiment, each of the air quality controller 40 and the air quality sensor module 42 can be mounted to the rear wall 20 (e.g., with fasteners). In other embodiments, the air quality controller 40 and/or the air quality sensor module 42 can be located remotely from the enclosure 12, such as mounted on a nearby wall.

The bottom plate 26 can be releasably coupled to the sidewalls 16 to facilitate selective removal of the heating module 24 from the enclosure 12 to allow for replacement and/or servicing of the combustion unit 28. In one embodiment, the bottom plate 26 can be attached to the sidewalls 16 with releasable fasteners (not shown), such as screws or bolts. In another embodiment, the sidewalls 16 and the bottom plate 26 can be slidably supported within a pair of grooves (not shown) that support the bottom plate 26 and allow it to be slidably removed or installed from the enclosure 12. In yet another embodiment, the sidewalls 16 and the bottom plate 26 can have opposing locking mechanical interfaces (such as a tab and groove arrangement) that interface with each other to selectively lock the bottom plate 26 in place relative to the enclosure 12. The heating module 24 can accordingly be serviced or replaced more easily, more cost effectively, and more efficiently than conventional arrangements that are rigidly secured to a surrounding enclosure.

Referring again to FIGS. 2 and 3, the front wall 18 can include an access panel 44 that is located adjacent to the fuel delivery unit 30. The access panel 44 can provide direct access to the fuel delivery unit 30 to allow for lighting of a pilot light (not shown) or for performing other minor maintenance on the fuel delivery unit 30 that would otherwise require the heating module 24 to be entirely removed from the enclosure 12, as described above.

Referring again to FIGS. 1-3, each of the sidewalls 16 of the enclosure 12 can include an upper portion 46, a central portion 48, and a lower portion 50. For each of the sidewalls 16, the upper portion 46 can be located adjacent to the top plate 14, the lower portion 50 can be located adjacent to the heating module 24 and the central portion 48 can extend therebetween. A pair of handles 52 can each be coupled with respective ones of the central portions 48 to facilitate manual lifting of the heater 10. The enclosure 12 can include a pair of subframes 54 (one shown) that each underlie respective ones of the upper portion 46 and the central portion 48 of the sidewall 16. Each of the subframes 54 can define a plurality of openings 56 (shown with respect to one of the subframes 54) that are disposed adjacent to respective ones of the upper portions 46 of the sidewalls 16.

Each of the upper portions 46 of the sidewalls 16 can define a plurality of exhaust holes 58, and each of the lower portions 50 of the sidewalls 16 can define a plurality of intake holes 60. The bottom plate 26 can also define a plurality of intake holes 62. During operation of the heating module 24, ambient air can be drawn through the plurality of intake holes 60, 62 and delivered to the combustion unit 28 to facilitate combustion of fuel at the manifold 32. The carbon dioxide produced by the combustion unit 28 can flow upwardly through the enclosure 12 and can be exhausted through the openings 56 in the subframe 54 and through the exhaust holes 58 for delivery to the surrounding environment.

Figure 5:
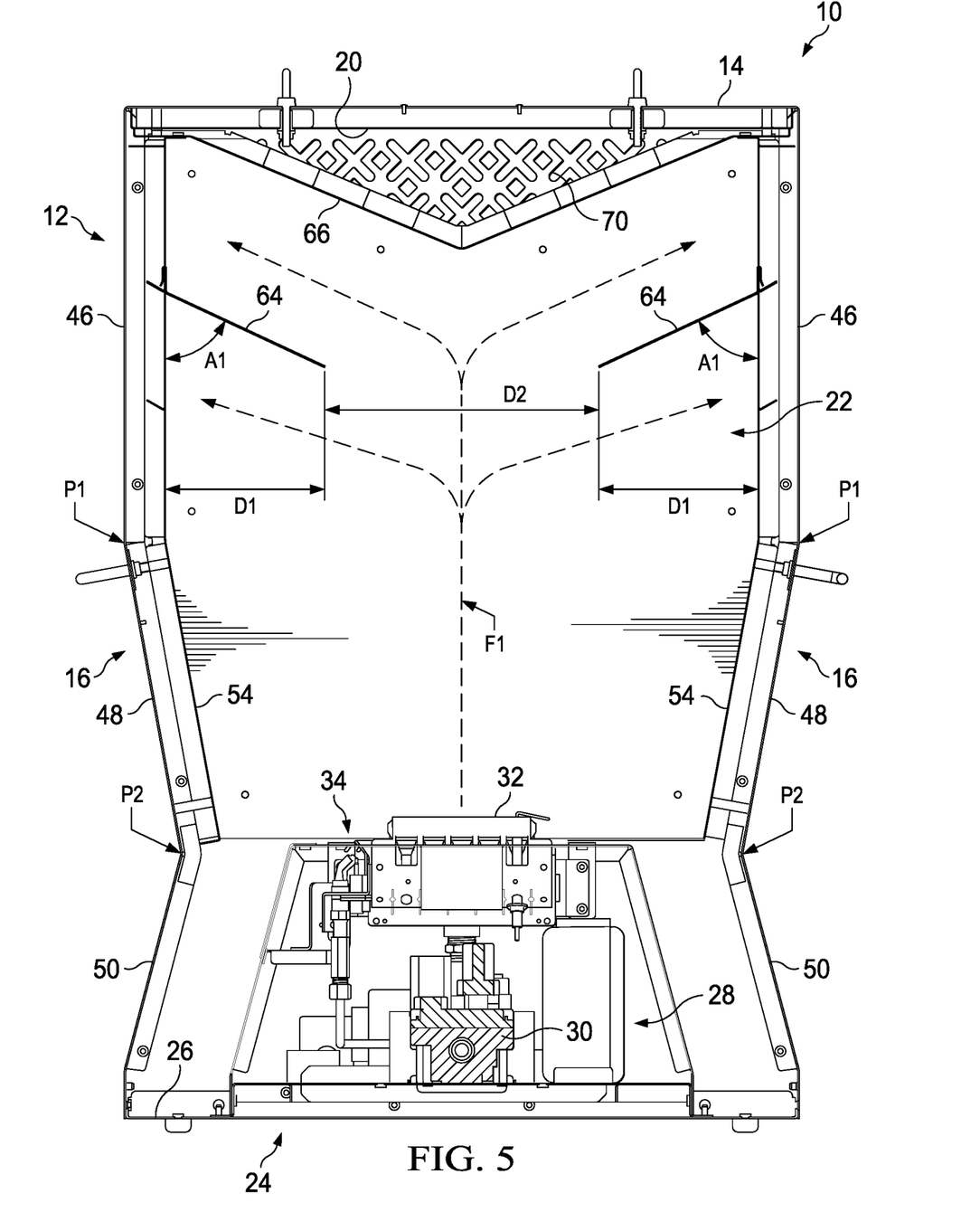
FIG. 5 is a cross sectional view taken along the line 5-5 in FIG. 2.

Referring now to FIG. 5, the upper portions 46 of the sidewalls 16 can be substantially perpendicular to the top plate 14. The central portions 48 can extend downwardly from their respective upper portions 46 and can be angled inwardly towards each other. The enclosure 12 can have a perimeter P1 (e.g., FIGS. 1 and 2) at the location where the upper portions 46 and the central portions 48 meet. The lower portions 50 can extend downwardly from their respective central portions 48 and be angled outwardly away from each other. The enclosure 12 can have a perimeter P2 (e.g., FIGS. 1 and 2) at the location where the central portions 48 and the lower portions 50 meet. The perimeter P2 can be smaller than the perimeter P1 such that the enclosure 12 is narrower at the combustion unit 28 than at the exhaust holes 58 (FIG. 3). This shape of the enclosure 12 can facilitate routing of the carbon dioxide upwardly from the combustion unit 28 through the enclosure 12 and towards the exhaust holes 58 more effectively than if the sidewalls 16 were completely (e.g., entirely or substantially entirely) planar.

A pair of baffle plates 64 can each be coupled with, and can extend from, respective ones of the sidewalls 16 to facilitate routing of carbon dioxide through the exhaust holes 58, as will be described in further detail below. The baffle plates 64 can be disposed beneath the top plate 14 and above the heating module 24. One of the baffle plates 64 will now be described as a representative example of both of the baffle plates 64 shown in FIG. 5. The baffle plate 64 can be coupled with the subframe 54, such as, for example, with fasteners or through welding. The baffle plate 64 can extend laterally across the sidewall 16 (e.g., across substantially the entire width of the sidewall 16). The baffle plate 64 can extend inwardly from the sidewall along a horizontal distance D1 and downwardly from the sidewall 16 towards the heating module 24 at an angle A1. In one embodiment, the angle A1 can be less than 90 degrees and more specifically between about 40 degrees and about 60 degrees. The baffle plate 64 can be arranged on the sidewall 16 such that at least one of the openings 56 of the subframe 54 and a portion of the exhaust holes 58 are located above the baffle plate 64 and at least one of the openings 56 of the subframe 54 and a portion of the exhaust holes 58 are located beneath the baffle plate 64.

The baffle plate 64 can have a substantially rectangular shape and a substantially flat profile. The baffle plate 64 can be formed of a material that is impervious to carbon dioxide such as, for example, sheet stainless steel or sheet aluminum. In one embodiment, the baffle plate 64 can be formed of one continuous sheet of such material. In another embodiment, the baffle plate 64 can be formed of a plurality of sheets of such material that overlap and are attached together (e.g., with screws or rivets or though welding) and cooperate to create a carbon dioxide impervious barrier.

Still referring to FIG. 5, the baffle plates 64 can be horizontally spaced from each other by a distance D2 that defines an air gap between the baffle plates 64. In one embodiment, the distance D2 can be greater than the horizontal distance D1 that each of the baffle plates 64 extend from the sidewalls 16. The sidewalls 16 and the baffle plates 64 can accordingly cooperate with each other to define a tortuous fluid path F1 (shown in dashed lines) that extends from the heating module 24 and around the baffle plates 64 to the exhaust holes 58 that are disposed above and beneath the baffle plates 64. It is to be appreciated that a path described herein as being tortuous can be understood to mean that the fluid path that originates from the heating module 24 is redirected by the baffle plates 64 into separate paths that are routed to different groups of exhaust holes 58 on each sidewall 16 that are vertically separate from each other.

When the heating module 24 generates carbon dioxide, the tortuous path created by the baffle plates 64 can allow the carbon dioxide to be distributed more evenly and consistently to the outside environment, which can increase the amount of carbon dioxide that reaches the outside environment as compared to conventional arrangements. The heater 10 can therefore produce carbon dioxide more cost effectively and with less environmental impact than these conventional arrangements.

Still referring to FIG. 5, the enclosure 12 can include a diverter plate 66 that is disposed beneath the top plate 14 and above the baffle plates 64. The diverter plate 66 can have a similar two-dimensional shape as the baffle plates 64 and can cooperate with the baffle plates 64 to facilitate routing of the carbon dioxide through the exhaust holes 58. As illustrated in FIGS. 1-3, the front wall 18 can define a plurality of vent holes 68 and the rear wall 20 can define a plurality of vent holes 70. The vent holes 68, 70 can be disposed between top plate 14 and the diverter plate 66 and can allow for venting of the area between the top plate 14 and the diverter plate 66 to prevent undesired collection of carbon dioxide or other fluids between the top plate 14 and the diverter plate 66.

Figure 6:
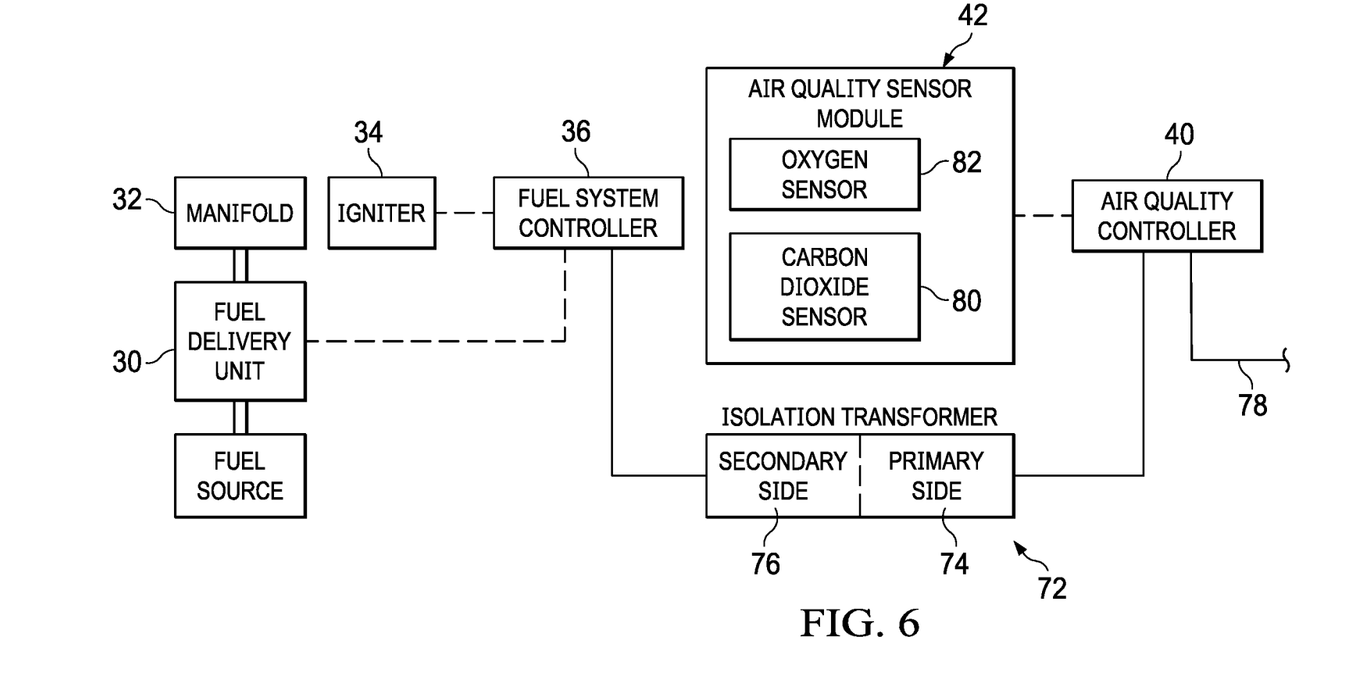
FIG. 6 is a schematic view depicting certain components of the heater of FIG. 1.

Referring now to FIG. 6, a schematic view of the heater 10 is illustrated and will now be described. The fuel system controller 36 can be in signal communication with the fuel delivery unit 30 and the igniter 34 (shown in dashed lines) to facilitate control of the dispensation and combustion of fuel (shown in double lines) at the manifold 32. The fuel system controller 36 can be powered by the air quality controller 40 through an isolation transformer 72. The isolation transformer 72 can include a primary side 74 that is electrically coupled with the air quality controller 40 and a secondary side 76 that is electrically coupled with the fuel system controller 36 (both electrical connections shown as a solid lines).

The air quality controller 40 can include a power input 78 (shown as a solid line) that can receive external power from a power source, such as an A/C power source, for powering the air quality controller 40 and the fuel system controller 36 simultaneously. In one embodiment, the power input 78 can be a conventional three-prong plug that can be plugged into a wall receptacle for delivering about 120 VAC to the air quality controller 40. It is to be appreciated that the power input 78 can have any of a variety of suitable alternative configurations for receiving power from a power source, such as a DC power source, for example.

The isolation transformer 72 can be configured such that the primary side 74 and the secondary side 76 are galvanically isolated from each other (e.g., the primary side 74 and the secondary side 76 do not have a conductive path therebetween). The isolation transformer 72 can electrically isolate the components that are responsible for fuel combustion (e.g., the fuel delivery unit 30, the manifold 32, the igniter 34, and the fuel system controller 36) from the input power (e.g., from the air quality controller 40) to reduce the risk of an electrical fault inadvertently igniting the fuel. As a result, the heater 10 can conform to certain safety requirements (e.g., an Electrical Testing Labs certification) that are not otherwise achievable by conventional heaters. In one embodiment, the isolation transformer 72 can comprise an NEC Class 2 transformer. It is to be appreciated, however, that any of a variety of suitable alternative isolated transformers are contemplated.

In one embodiment, the fuel system controller 36 can be configured to operate at a lower voltage (e.g., between about 7 VAC and 26 VAC) than the voltage provided by the power source (e.g., about 120 VAC) at the power input 78. In such an arrangement, the isolation transformer 72 can be a step-down transformer that is configured to convert the voltage at the primary side 74 to a lower voltage at the secondary side 76. It is to be appreciated that any of a variety of suitable transformer configurations are contemplated (e.g., a step-up transformer) to conform to the voltage requirements of the fuel system controller 36 and the air quality controller 40.

The air quality monitoring system 38 (FIG. 3) can be configured to selectively interrupt power to the fuel system controller 36 as a function of an air quality condition detected by the air quality sensor module 42. Still referring to FIG. 6, the air quality sensor module 42 can be in signal communication with the air quality controller 40 (shown as a dashed line). The air quality sensor module 42 can include a carbon dioxide sensor 80 and an oxygen sensor 82 that are configured to detect a carbon dioxide level and an oxygen level, respectively, of the surrounding air. In one embodiment, as illustrated in FIGS. 1 and 3, the air quality sensor module 42 can include a housing 84 that houses both the carbon dioxide sensor 80 and the oxygen sensor 82. The air quality controller 40 can monitor the carbon dioxide level and the oxygen level of the surrounding air from the carbon dioxide sensor 80 and the oxygen sensor 82. If the carbon dioxide level or the oxygen level falls outside of a predetermined safe range, the air quality controller 40 can interrupt (e.g., disconnect the power that is delivered to the fuel system controller 36 (via the isolation transformer 72)) to effectively shut down the heating module 24. While the heating module 24 is shut down, the air quality controller 40 can continue to monitor the carbon dioxide level and the oxygen level. If the carbon dioxide level and the oxygen level return to a safe level, the air quality controller 40 can introduce power again to the fuel system controller 36 to initialize fuel combustion at the heating module 24. This process can continue throughout operation of the heater 10 to ensure that the environment within the indoor grow facility remains safe. It is to be appreciated that, although a carbon dioxide sensor (e.g., 80) and an oxygen sensor (e.g., 82) are shown, any of a variety or suitable alternative environmental sensors can be used to determine air quality.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather, it is hereby intended that the scope be defined by the claims appended hereto. Also, for any methods claimed and/or described, regardless of whether the method is described in conjunction with a flow diagram, it should be understood that unless otherwise specified or required by context, any explicit or implicit ordering of steps performed in the execution of a method does not imply that those steps must be performed in the order presented and may be performed in a different order or in parallel.

What is claimed is:

1. A heater for an indoor grow facility, the heater comprising:
    an enclosure comprising:
        a first wall;
        a second wall opposite the first wall; and
        a top plate extending between the first wall and the second wall and cooperating with the first wall and the second wall to at least partially define an interior;
    a first baffle plate coupled with the first wall and extending therefrom, the first baffle plate being disposed beneath the top plate;
    a second baffle plate coupled with the second wall and extending therefrom, the second baffle plate being disposed beneath the top plate; and
    a heating module coupled with the enclosure and disposed beneath the first baffle plate and the second baffle plate, the heating module configured to generate carbon dioxide for presentation into the interior, wherein:
        the first wall defines a first plurality of exhaust holes adjacent the first baffle plate;
        the second wall defines a second plurality of exhaust holes adjacent the second baffle plate; and
        the first baffle plate and the second baffle plate are spaced from each other and cooperate with the first wall and the second wall, respectively, to define a tortuous fluid path between the heating module and the first and second pluralities of exhaust holes.

2. The heater of claim 1 wherein the first plurality of exhaust holes are disposed above the first baffle plate and the second plurality of exhaust holes are disposed above the second baffle plate.

3. The heater of claim 1 wherein the first plurality of exhaust holes are disposed below the first baffle plate and the second plurality of exhaust holes are disposed below the second baffle plate.

4. The heater of claim 1 wherein:
    the first wall defines a first plurality of intake holes adjacent the heating module; and
    the second wall defines a second plurality of intake holes adjacent the heating module.

5. The heater of claim 1 wherein the heating module further comprises:
    a bottom plate coupled with the first wall and the second wall; and
    a combustion unit coupled to the bottom plate.

6. The heater of claim 5, wherein the bottom plate is releasably coupled to the first wall and the second wall to facilitate selective removal of the heating module from the enclosure.

7. The heater of claim 1 wherein:
the first baffle plate extends downwardly from the first wall towards the heating module; and
the second baffle plate extends downwardly from the second wall towards the heating module.

8. The heater of claim 1 wherein:
the first wall comprises a first upper portion, a first central portion, and a first lower portion;
the second wall comprises a second upper portion, a second central portion, and a second lower portion;
the first central portion extends from the first upper portion and is angled inwardly towards the second wall;
the second central portion extends from the second upper portion and is angled inwardly towards the first wall;
the first lower portion extends from the first central portion and is angled outwardly away from the second wall; and
the second lower portion extends from the second central portion and is angled outwardly away from the first wall.

9. The heater of claim 1 further comprising a diverter plate disposed beneath the top plate and above the first baffle plate and the second baffle plate, the diverter plate cooperates with the first baffle plate and the second baffle plate to facilitate routing of carbon dioxide through the first and second pluralities of exhaust holes.

10. A heater for an indoor grow facility, the heater comprising:
a heating module configured to generate carbon dioxide, the heating module comprising a fuel system controller that is configured to control operation of the heating module;
an air quality monitoring system comprising:
an air quality controller;
at least one air quality sensor in signal communication with the air quality controller, the at least one air quality sensor being configured to detect at least one air quality condition; and
a power input that is configured to receive power from a power source for powering of the air quality controller and the at least one air quality sensor; and
an isolation transformer electrically coupled with each of the fuel system controller and the air quality monitoring system, the isolation transformer being configured to deliver the power from the air quality monitoring system to the fuel system controller to facilitate powering thereof, wherein the air quality monitoring system is configured to selectively interrupt the power to the fuel system controller as a function of the at least one air quality condition detected by the at least one air quality sensor.

11. The heater of claim 10 wherein the isolation transformer comprises a step-down transformer that is configured to convert a voltage from the power source to a lower voltage that is delivered to the fuel system controller.

12. The heater of claim 10 wherein:
the at least one air quality condition comprises an oxygen level; and
the at least one air quality sensor comprises an oxygen sensor that is configured to detect the oxygen level.

13. The heater of claim 10 wherein:
the at least one air quality condition comprises a carbon dioxide level; and
the at least one air quality sensor comprises a carbon dioxide sensor that is configured to detect the carbon dioxide level.

14. The heater of claim 10 wherein:
the at least one air quality condition comprises an oxygen level and a carbon dioxide level; and
the at least one air quality sensor comprises an oxygen sensor that is configured to detect the oxygen level and a carbon dioxide sensor that is configured to detect the carbon dioxide level.

15. The heater of claim 14 wherein the at least one air quality sensor comprises a housing that houses the oxygen sensor and the carbon dioxide sensor.

16. A heater for an indoor grow facility, the heater comprising:
an enclosure comprising:
a first wall;
a second wall opposite the first wall; and
a top plate extending between the first wall and the second wall and cooperating with the first wall and the second wall to at least partially define an interior;
a first baffle plate coupled with the first wall and extending therefrom, the first baffle plate being disposed beneath the top plate;
a second baffle plate coupled with the second wall and extending therefrom, the second baffle plate being disposed beneath the top plate;
a heating module coupled with the enclosure and disposed beneath the first baffle plate and the second baffle plate, the heating module configured to generate carbon dioxide for presentation into the interior, the heating module comprising a fuel system controller that is configured to control operation of the heating module;
an air quality monitoring system comprising:
an air quality controller;
at least one air quality sensor in signal communication with the air quality controller, the at least one air quality sensor being configured to detect at least one air quality condition; and
a power input that is configured to receive power from a power source for powering of the air quality controller and the at least one air quality sensor; and
an isolation transformer in electrical communication with each of the fuel system controller and the air quality monitoring system, the isolation transformer being configured to deliver the power from the air quality monitoring system to the fuel system controller to facilitate powering thereof, wherein:
the first wall defines a first plurality of exhaust holes adjacent the first baffle plate;
the second wall defines a second plurality of exhaust holes adjacent the second baffle plate;
the first baffle plate and the second baffle plate are spaced from each other and cooperate with the first wall and the second wall, respectively, to define a tortuous fluid path between the heating module and the first and second pluralities of exhaust holes; and
the air quality monitoring system is configured to selectively interrupt the power to the fuel system controller as a function of the at least one air quality condition detected by the at least one air quality sensor.

17. The heater of claim 16 wherein the heating module further comprises:
a bottom plate coupled with the first wall and the second wall; and
a combustion unit coupled to the bottom plate.

18. The heater of claim 17, wherein the bottom plate is releasably coupled to the first wall and the second wall to facilitate selective removal of the heating module from the enclosure.

19. The heater of claim 16 wherein:

the first wall comprises a first upper portion, a first central portion, and a first lower portion;

the second wall comprises a second upper portion, a second central portion, and a second lower portion;

the first central portion extends from the first upper portion and is angled inwardly towards the second wall;

the second central portion extends from the second upper portion and is angled inwardly towards the first wall;

the first lower portion extends from the first central portion and is angled outwardly away from the second wall; and the second lower portion extends from the second central portion and is angled outwardly away from the first wall.

20. The heater of claim 16 wherein:

the at least one air quality condition comprises an oxygen level and a carbon dioxide level; and the at least one air quality sensor comprises an oxygen sensor that is configured to detect the oxygen level and a carbon dioxide sensor that is configured to detect the carbon dioxide level.

* * * * *